United States Patent
Harbinson et al.

(10) Patent No.: US 10,223,243 B2
(45) Date of Patent: Mar. 5, 2019

(54) VERSION PERFORMANCE DATA DELTA TESTER AND METHODS ASSOCIATED WITH USING SAME

(71) Applicant: Bank of America Corporation, Charlotte, NC (US)

(72) Inventors: Charles C. Harbinson, Charlotte, NC (US); Brendan P. Murphy, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 15/043,683

(22) Filed: Feb. 15, 2016

(65) Prior Publication Data
US 2017/0235669 A1 Aug. 17, 2017

(51) Int. Cl.
*G06F 8/65* (2018.01)
*G06F 11/36* (2006.01)

(52) U.S. Cl.
CPC ............ *G06F 11/3668* (2013.01); *G06F 8/65* (2013.01); *G06F 11/3692* (2013.01)

(58) Field of Classification Search
CPC ............. G06F 11/3688; G06F 11/3668; G06F 11/3692; G06F 8/65
See application file for complete search history.

(56) References Cited

U.S. PATENT DOCUMENTS

| | | | |
|---|---|---|---|
| 5,600,574 A | 2/1997 | Reitan | |
| 7,376,258 B2 | 5/2008 | Klein et al. | |
| 7,433,098 B2 | 10/2008 | Klein et al. | |
| 8,379,914 B2 | 2/2013 | Nepomniachtchi et al. | |
| 8,582,862 B2 | 11/2013 | Nepomniachtchi et al. | |
| 8,620,057 B1 * | 12/2013 | Thomas | G06K 9/2054 382/135 |
| 8,837,806 B1 * | 9/2014 | Ethington | G06Q 20/0425 382/140 |
| 8,983,170 B2 | 3/2015 | Nepomniachtchi et al. | |
| 9,582,408 B1 * | 2/2017 | Jayaraman | G06F 11/3688 |
| 2004/0017947 A1 * | 1/2004 | Yang | G06K 9/6252 382/224 |
| 2004/0076320 A1 * | 4/2004 | Downs, Jr. | G06K 9/03 382/139 |

(Continued)

*Primary Examiner* — Lewis A Bullock, Jr.
*Assistant Examiner* — Tina Huynh
(74) *Attorney, Agent, or Firm* — Weiss & Arons LLP; Michael A. Springs, Esq.

(57) ABSTRACT

An article of manufacture is described. The article of manufacture may include a computer usable medium having computer readable program code embodied therein. The code when executed by a processor may cause a computer to generate version performance digital image data delta information. The code may cause the computer to receive a plurality of digital images, a plurality of legacy rejections associated with the digital images and a plurality of updated rejections associated with the digital images. The code may cause the computer to identify one or more digital images that trigger a first rejection with the legacy version and that trigger a second rejection with the updated version wherein the first rejection and the second rejection are the same rejection and to identify one or more occurrences wherein the first rejection and the second rejection are different rejections.

16 Claims, 4 Drawing Sheets

| Prod (4.2) | DEV1 (4.4) | Count |
|---|---|---|
| 2 front images | 2 front images | 174 |
| Lack of Contrast | Contrast of image | 145 |
| Corner Cut | Cut Corners | 232 |
| Could Not Read MICR | Cut Corners | 29 |
| IQAGOOD | Cut Corners | 29 |
| Out of Focus | Cut Corners | 29 |
| poor image quality | Default | 203 |
| Too Much Rotation Angle | Default | 29 |
| Out of Focus | Focus of Image | 58 |
| Check Too Small | Image Too Small | 116 |
| Could Not Read MICR | IQAGOOD | 29 |
| IQAGOOD | IQAGOOD | 695 |
| Missing/Invalid Endorsement | IQAGOOD | 58 |
| Out of Focus | IQAGOOD | 29 |
| Too Much Rotation Angle | IQAGOOD | 29 |
| Could Not Read MICR | MICR Confidence | 145 |
| Missing/Invalid Endorsement | Restriction Endorsement - Bad Crop | 29 |
| Check Too Small | Restriction Endorsement - Bad Quality | 29 |
| IQAGOOD | | 29 |
| Missing/Invalid Endorsement | | 29 |
| Too Much Rotation Angle | Rotation Angle | 58 |
| Canadian Check Rejection | United States | 87 |

(56) References Cited

U.S. PATENT DOCUMENTS

| | | | |
|---|---|---|---|
| 2005/0213805 A1* | 9/2005 | Blake | G06K 9/036 382/137 |
| 2005/0244035 A1* | 11/2005 | Klein | G06K 9/036 382/112 |
| 2007/0079189 A1* | 4/2007 | Jibbe | G01R 31/31707 714/724 |
| 2009/0279744 A1* | 11/2009 | Zimmerman | G06K 9/00161 382/112 |
| 2011/0280450 A1* | 11/2011 | Nepomniachtchi | G06K 9/036 382/112 |
| 2012/0159443 A1* | 6/2012 | Kamenz | G06F 11/368 717/124 |
| 2013/0085935 A1* | 4/2013 | Nepomniachtchi | G06Q 20/322 705/40 |
| 2013/0223721 A1* | 8/2013 | Nepomniachtchi | G06K 9/00536 382/138 |
| 2014/0122332 A1* | 5/2014 | Viera | G06Q 20/108 705/42 |
| 2016/0092210 A1* | 3/2016 | Kuchibhotla | G06F 8/71 717/121 |

* cited by examiner

| QA Message | Device OS | Device Type | Device Version |
|---|---|---|---|
| poor image quality | 7.1.2 | APPLE | iPhone5.3 |
| Out of Focus | 8.4.1 | APPLE | iPhone7.1 |
| Could Not Read MICR | 8.4 | APPLE | iPhone7.1 |
| Could Not Read MICR | Android 5.0 | GOOGLE | samsung SAMSUNG-SM-G900A |
| Could Not Read MICR | Android 4.4.4 | GOOGLE | samsung GT-I9505G |
| Missing/Invalid Endorsement | Android 5.0 | GOOGLE | samsung SM-N900T |
| poor image quality | Android 4.0.4 | GOOGLE | motorola DROID BIONIC |
| Missing/Invalid Endorsement | Android 4.4.4 | GOOGLE | samsung SAMSUNG-SM-G870A |
| Could Not Read MICR | Android 4.4.2 | GOOGLE | zte Z830 |
| Could Not Read MICR | 8.4 | APPLE | iPhone5.3 |
| Out of Focus | 8.4.1 | APPLE | iPhone6.1 |
| poor image quality | Android 5.0 | GOOGLE | samsung SAMSUNG-SM-G900A |
| Missing/Invalid Endorsement | 8.0.2 | APPLE | iPhone7.2 |
| Could Not Read MICR | 8.4.1 | APPLE | iPhone7.2 |
| Missing/Invalid Endorsement | 8.4 | APPLE | iPhone5.2 |
| Missing/Invalid Endorsement | 8.2 | APPLE | iPhone7.2 |
| Could Not Read MICR | 8.4 | APPLE | iPhone6.1 |
| Missing/Invalid Endorsement | 8.4.1 | APPLE | iPhone7.2 |
| poor image quality | 8.3 | APPLE | iPhone6.1 |
| poor image quality | 8.3 | APPLE | iPhone7.1 |
| poor image quality | Android 4.3 | GOOGLE | HAUWEI HUAWEI Y536A1 |
| Missing/Invalid Endorsement | 8.3 | APPLE | iPhone7.1 |
| Could Not Read MICR | 7.0.4 | APPLE | iPod5.1 |

FIG. 1

| Prod (4.2) | DEV1 (4.4) | Count |
|---|---|---|
| 2 front images | 2 front images | 174 |
| Lack of Contrast | Contrast of image | 145 |
| Corner Cut | Cut Corners | 232 |
| Could Not Read MICR | Cut Corners | 29 |
| QAGOOD | Cut Corners | 29 |
| Out of Focus | Cut Corners | 29 |
| poor image quality | Default | 203 |
| Too Much Rotation Angle | Default | 29 |
| Out of Focus | Focus of Image | 58 |
| Check Too Small | Image Too Small | 116 |
| Could Not Read MICR | IQAGOOD | 29 |
| IQAGOOD | IQAGOOD | 695 |
| Missing/Invalid Endorsement | IQAGOOD | 58 |
| Out of Focus | IQAGOOD | 29 |
| Too Much Rotation Angle | IQAGOOD | 29 |
| Could Not Read MICR | MICR Confidence | 145 |
| Missing/Invalid Endorsement | Restriction Endorsement - Bad Crop | 29 |
| Check Too Small | Restriction Endorsement - Bad Quality | 29 |
| IQAGOOD | Restriction Endorsement - Bad Quality | 29 |
| Missing/Invalid Endorsement | | 29 |
| Too Much Rotation Angle | Rotation Angle | 58 |
| Canadian Check Rejection | United States | 87 |

FIG. 3

Transaction Tester — 402

SOAP Maintenance Reporting

| Field | Value |
|---|---|
| Environment To Make SOAP Calls to | DEV 1 |
| Store SOAP Results to Column | DEV 1 |
| Clear Results Column | ☑ |
| Transaction Review | |
| Average Response Time | 2550 ms |
| SOAP Calls Made | 2223 |
| Transaction ID | 82821096 |
| Response | Restrictive Endorsement-Bad Corp |

Transaction Tester — 404

SOAP Maintenance Reporting

Prod ▼ vs DEV1 ▼  [Export]

Out of 20014 results Prod had 5264 IQAGOOD and DEV1 has 8266

| Prod | DEV1 | Count |
|---|---|---|
| Lack of Contrast | MICR Confluence | 6 |
| Out of Focus | Default | 17 |
| Out of Focus | Image Too Small | 2 |
| 2 front images | Default | 2 |
| IQAGOOD | MICR Confidence | 18 |
| IQAGOOD | Restrictive Endorsement-Bad Crop | 17 |
| Too Much Rotation Angle | Default | 4 |
| Out of Focus | MICR Confidence | 32 |
| Corner Cut | Restrictive Endorsement-Bad Quality | 2 |
| Too Much Rotation Angle | IQAGOOD | 6 |
| poor image quality | MICR Confidence | 290 |
| Could Not Read MICR | 2 front images | 2 |
| IQAGOOD | 2 front images | 1 |
| Corner Cut | Restrictive Endorsement-Bad Crop | 5 |
| poor image quality | Default | 2419 |
| poor image quality | United States | 1 |
| Missing/Invalid Endorsement | Restrictive Endorsement-Bad Quality | 1342 |
| poor image quality | Endorsement Present | 8 |

VERSION PERFORMANCE DATA DELTA TESTER AND METHODS ASSOCIATED WITH USING SAME

FIELD OF TECHNOLOGY

This disclosure is related to testing results obtained from various application testing versions.

BACKGROUND

Various data testing applications may obtain different results when testing the same data. The difference between the testing results may be referred to herein as the delta. The delta may play an especially prominent role when the new version of the data testing application introduces updated features and/or updated data rejection criterion or standards previously not found in the legacy versions.

It would be desirable to provide a version performance data delta tester.

It would be further desirable to provide a version performance data delta tester that provides images associated with data in order to provide additional information regarding new rejections associated with a new version, incorporating new features and/or new reasons for rejections.

SUMMARY OF THE INVENTION

Apparatus, methods, code and encoded media (individually or collectively, "the tester") for testing application version data in a complex machine information environment are provided. The complex information environment may be administered by an institution.

A version performance digital image data delta tester according to certain embodiments may include a receiver configured to receive a plurality of testable digital images. The plurality of digital images may be derived using a mobile handheld device. The plurality of digital images may be derived from a plurality of physical objects. The plurality of digital images may be associated with real production images.

The receiver may also be configured to receive a plurality of legacy rejections associated with the plurality of digital images. The legacy rejections may be associated with a legacy version of an application. The application may be associated with a legacy device and/or a legacy version of a device.

The receiver may also be configured to receive a plurality of updated rejections associated with the plurality of digital images. The updated rejections may be associated with an updated version of the application and/or device.

The tester may also include a processor configured to store the plurality of digital images, the plurality of legacy rejections and the plurality of updated rejections. The processor may also be configured to identify one or more digital images that trigger a first rejection with the legacy version and that trigger a second rejection with the updated version wherein the first rejection and the second rejection are the same rejection. In certain embodiments the processor may be configured to identify one more digital images that trigger a first rejection with the legacy version and that trigger a second rejection with the updated version wherein the first rejection and the second rejection are different rejections.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 1 shows an illustrative data test display screen in accordance with the principles of the embodiments;

FIG. 3 shows an illustrative data test display delta screen in accordance with the principles of the embodiments; and FIG. 4 shows a series of illustrative data test display delta screens for use with the embodiments.

DETAILED DESCRIPTION OF THE INVENTION

Figure 2:
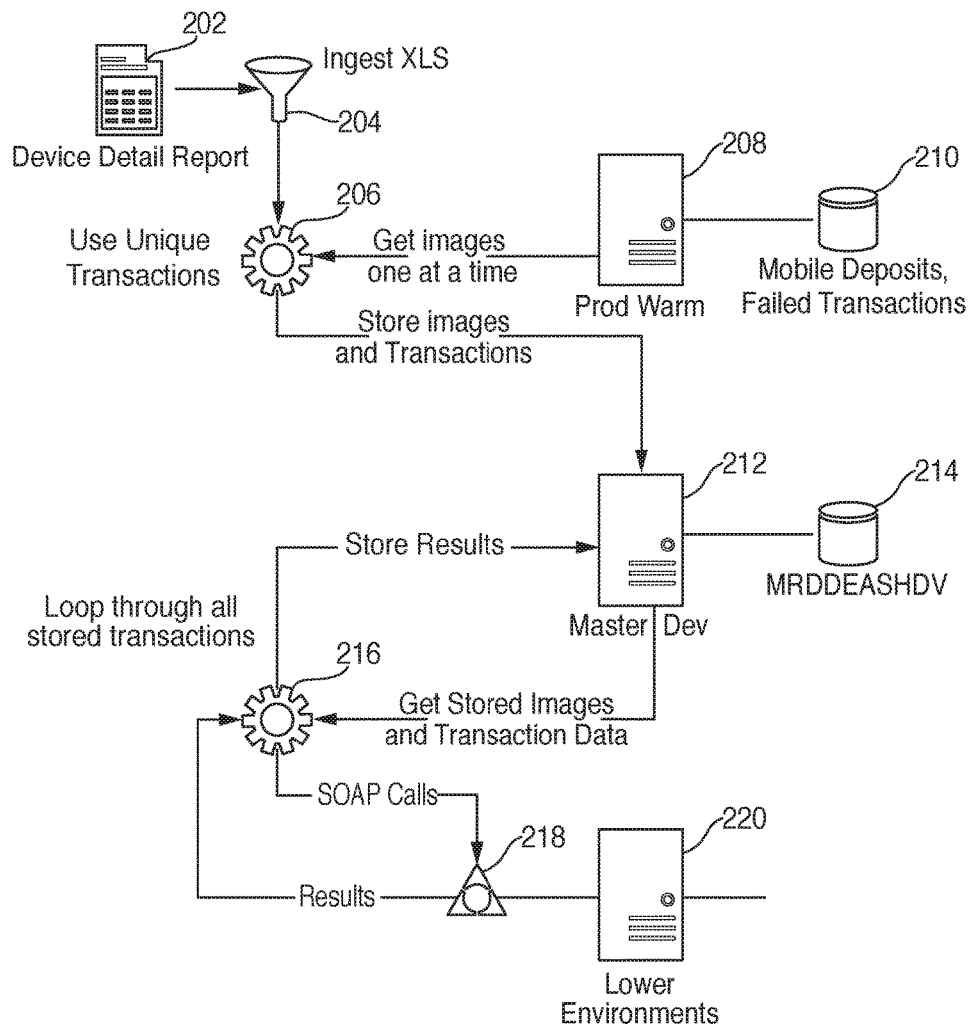
FIG. 2 shows an illustrative flow diagram in accordance with the principles of the embodiments.

Many applications are periodically upgraded. Applications which reside on a handheld device are often also upgraded when a new handheld device, or a new version of an old handheld device, is introduced. Typically, the upgraded applications and/or the new applications when they are introduced on a new handheld device may obtain different results from legacy applications and/or legacy devices.

It would be desirable to efficiently determine the difference in performance between different versions of an application and/or different applications that reside on different devices. It would be especially desirable to efficiently determine the differences in performance and/or operation between different versions of a data testing application that uses test data generated by various applications and/or application versions.

A version performance digital image data delta tester is provided. The tester may include a first machine readable memory. The first memory may be configured to store a legacy version of a software application. The application may preferably be used for testing a plurality of testable digital images.

The plurality of digital images may be derived using a mobile handheld device. The plurality of digital images may correspond to a plurality of physical objects. The legacy version may determine whether the digital images are rejected in response to one of a plurality of legacy rejections.

The tester may also include a second machine readable memory. The second machine readable memory may be configured to store an updated version of the application. The updated version may determine whether the digital images are rejected in response to an updated plurality of rejections.

The tester may also include a receiver. The receiver may be configured to receive the plurality of digital images.

The tester may also include a processor configured to process the plurality of digital images using the legacy version. The processor may be further configured to process the plurality of digital images using the updated version. The processor may also be configured to identify one or more digital images that trigger a first rejection with the legacy version and that trigger a second rejection with the updated version. The first rejection may be the same as the second rejection. The first rejection may be different from the second rejection.

The first rejection may be selected from a group including poor image quality, out of focus, unable to read a magnetic ink character recognition ("MICR") line, too much rotation angle, image too small, invalid image jurisdiction, missing/invalid endorsement(s) and/or corners cut. The first rejection may be any suitable rejection.

The second rejection may be selected from a group including of poor image quality, out of focus, unable to read a magnetic ink character recognition ("MICR") line, too much rotation angle, image too small, invalid image jurisdiction, missing/invalid endorsement, corners cut, contrast of image and/or bad crop. The second rejection may be any suitable rejection.

The legacy version and/or image may be characterized by a device operating system ("OS"), a device type, a device version and/or a rejection type. The updated version and/or image may be characterized by a device operating system ("OS"), a device type, a device version and/or a rejection type.

The receiver may be configured to receive the plurality of digital images in series. The receiver may be configured to receive the plurality of digital images at a rate of one image at a time.

The tester may also include a database. The database may store the digital images after receiving the digital images from failed transactions at a mobile device. The database may store the digital images after the receiver receives the digital images from a database. The processor may be further configured to throttle a rate of digital images receipt from the database.

In certain embodiments, a receiver may be configured to receive a plurality of testable digital images. The plurality of testable digital images may be derived using a mobile handheld device. The images may be based on a plurality of physical objects. The receiver may be configured to receive a plurality of legacy rejections associated with the plurality of digital images. The legacy rejections may be associated with a legacy version of an application. The receiver may also be configured to receive a plurality of updated rejections associated with the plurality of digital images. The updated rejections associated with an updated version of the application.

These embodiments may also include a processor configured to store the plurality of digital images, the plurality of legacy rejections, and the plurality of updated rejections. The processor may also be configured to identify one or more digital images that trigger a first rejection with the legacy version and that trigger a second rejection with the updated version wherein the first rejection and the second rejection are the same rejection. The processor may also be configured to identify one more digital images that trigger a first rejection with the legacy version and that trigger a second rejection with the updated version wherein the first rejection and the second rejection are different rejections.

In these, or other, embodiments, the physical objects are checks and the digital images are digital check images.

In certain embodiments, the tester may include a separate memory at a remote location. The plurality of digital images, the plurality of legacy rejections, and the plurality of updated rejections may all be received by the receiver within a pre-determined time following implementation of a failover process. The failover process may maintain, at the separate memory, an electronic copy of the plurality of digital images, an electronic copy of the plurality of legacy rejections, and an electronic copy of the plurality of updated rejections. The legacy version may be characterized by a device operating system ("OS"), a device type and a device version. The updated version may be characterized by a device operating system ("OS"), a device type and a device version.

In certain embodiments, the processor may be configured to instruct the receiver to receive the plurality of legacy digital images and updated digital images, the plurality of legacy rejections, and the plurality of updated rejections, and the processor to compare the legacy digital images to the updates digital images (as necessary) at a rate of between about 1300 images per hour and about 1700 images per hour. Most preferably, the processing may occur at a rate of 1500 images per hour.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones and/or other personal digital assistants ("PDAs"), multiprocessor systems, microprocessor-based systems, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage encoded media including memory storage device.

One of ordinary skill in the art will appreciate that the elements shown and described herein may be performed in other than the recited order and that one or more elements illustrated may be optional. The methods of the above-referenced embodiments may involve the use of any suitable elements, elements, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

FIG. 1 shows an illustrative data test display screen as displayed by a data display system in accordance with the principles of the embodiments. It should be noted that the data display screen of FIG. 1 could be generated using a legacy system. It should be noted that the data display screen of FIG. 1 could be generated using an updated system.

FIG. 1 includes a column 102 that displays an error message for each of a group of digital images. The digital images may be derived from images of a plurality of physical objects. The physical objects may be checks. The digital images may have been retrieved using a handheld device such as a smartphone or other handheld device. It would be noted that the digital images listed in FIG. 1 may preferably have been rejected by the device and/or application and, therefore, were preferably transmitted to the legacy system because the digital images were rejected at the handheld device.

FIG. 1 also includes a device operating system ("OS") column 104. Device OS column 104 may preferably list a version of the OS that was used to obtain the rejected legacy and/or digital images. Device type column 106 may preferably list a type of the device that was used to obtain the rejected digital images. Device version column 108 may preferably list a version of the device that was used to obtain the rejected digital images. Example line 108 shows an anomalous device listing. Because of the consolidation of the information regarding the rejections in GUIs as set forth herein, such a listing may be relatively easy to detect.

FIG. 2 shows an illustrative flow diagram in accordance with the principles of the embodiments. A device detail report 202 may preferably be generated by a legacy data display system. The screens in FIGS. 3 and 4 may be considered to be various embodiments of a detail report 202.

Report 202 generated by the legacy data system may also assign a confidence score to the generated data. The confidence score may preferably indicate the relative confidence attributable to the decisions made by the legacy system. The device detail report may preferably be transmitted to an ingestion point at 204. It should be noted that the information retrieved by a development system regarding analysis of the same data retrieved and analyzed by the legacy system, and which may be compared to the information retrieved by the legacy system, may also be assigned a confidence score. At least according to one embodiment, the confidence score assigned by the legacy system may preferably be compared to the confidence score assigned by the development system.

Ingestion point 204 may receive a device detail report as an XLS file, such as an Excel™ spreadsheet. The spreadsheet may be generated at one or more handheld devices and transmitted to the ingestion point. The spreadsheet may be constructed at the ingestion point based on the data received from one or more handheld devices.

The spreadsheet may preferably be generated using rejected digital images that were captured by the handheld device. FIG. 1 shows one example of such a spreadsheet.

At step 206, additional images may be retrieved. The additional images may be retrieved, preferably one image at a time, from a live production system 208.

It should be noted further that live production system 208 may have retrieved the additional images from a mobile deposits database 210. Database 210 may preferably have retrieved the failed transaction information from handheld devices (not shown).

While it has been indicated that the live production system has retrieved images, it should be noted that the images retrieved by live production system 208 may preferably be different from actual production images—i.e., images derived in real-time from production transactions. Accordingly, the images retrieved by live production system 208 may preferably have been insulated from real-time images at least because such images have first been stored in a first location prior to transmission to live production system 208. Such a storage may include storage in a failover system which, in certain embodiments, may protect the data itself from corruption as a result of operations performed on the data by system 208. In other words, in some embodiments, live production system 208 may include "warm" data—i.e., data that is retrieved from back up storage as opposed to data that corresponds to actual transmissions from customers. In such embodiments, preferably no direct, live, communication between customers and systems and/or methods according to the invention occurs.

At some point, unique transactions may be transmitted from image retrieval at 206 to master development system 212. Master development system 212 may be coupled to MRDDASHDEV development database 214.

Master development system 212 may provide a platform for enabling a user to generate reports. Such reports may include reports such as the reports shown in FIGS. 1, 3 and 4. Such reports may allow the retrieval, display and manipulation of data related to transaction images, as will be discussed in more detail below.

Master development system 212 preferably retrieves stored images and transaction data via SOAP calls (as shown schematically at 216 and 218). For the purposes of this application, SOAP should be understood as follows: systems interact with a Web service in a manner prescribed by its description using SOAP Simple Object Access Protocol ("SOAP") messages, typically conveyed using HTTP with an XML serialization in conjunction with other Web-related standards. In this context, steps 216 and 218 utilize a Web service type messaging. The schematics at 216 indicate that the retrieval of stored images and transaction data using SOAP messaging are implemented by using the Web-service type messaging for running against another environment.

At 220, lower environments are indicated. Such lower environments may preferably contain new or updated code—i.e., code that corresponds to a new device OS, a new device type, a new device version and/or any other change to the underlying transmitting device. Results obtained from the updated code may be used for comparison with results obtained from code currently in production.

Such updated code may be used for multiple iterations. Such iterations may preferably allow a user to vary the characteristics of the testing program in order to determine the effects of certain parameters on the number of testing rejections. For example, the code may include a pre-determined rejection associated with Magnetic Ink Character Recognition ("MICR") line intrusion. A MICR line introduction may include the number of, scope and/or quantity of MICR line intrusions. For the purposes of this application, MICR technology uses magnetically chargeable ink or toner to print the numbers and special characters on the bottom of checks or other financial transaction documents. The numbers usually include the account number from which the money will be drawn, the identification number, routing number and transit number of the check for the bank where the account resides. MICR technology is used in the banking industry in many countries because it allows very fast and reliable document processing.

FIG. 3 shows an illustrative data test display delta screen in accordance with the principles of the embodiments. The data test display delta screen shown in FIG. 3 may preferably include a first column 302 for legacy error reports, a second column 304 for updated error reports and a count column 306 for tallying occurrences of each combination of legacy and updated reports.

It should be noted that column 302 may relate to information derived from a legacy system that is currently in production whereas column 304 may relate to a system that may be in development and, while using actual live rejections, may only be retrieving images using systems that provide failover back-up protection for production systems.

Column 306 indicates the number of occurrences of the combination of the result pair set forth in the corresponding row entry in column 302 and column 304. For example, the first line of the table shown in FIG. 3 shows that column 302 indicates that the production system obtained a rejection result pair of two front images and that column 304 indicates that the development system also obtained a rejection result of two front images. Column 306 indicates that this combination occurred 174 times in the current test run—i.e., the comparison between the production system and the development system shown in FIG. 3.

FIG. 4 shows a series of illustrative data test display delta screens for use with the embodiments.

FIG. 4 shows a first Graphical User Interface ("GUI") screen 402 for differentiating between a legacy production set of image rejections and a development set of image rejections. It should be noted that the GUIs described herein may preferably be used to map a legacy application on a production application.

Screen 402 indicates that a transaction tester according to the embodiments preferably include a system for making SOAP calls to a first development system, DEV 1. In addition, the transaction tester may store SOAP results to a predetermined column. Screen 402 may also include a transaction review toggle button which determines whether the transaction tester implements a review of the transaction and comparison with production results.

FIG. 4 also shows GUI screen 404. Screen 404 may include a comparison screen similar to the screen shown in FIG. 3. Screen 404 may be configured to enable a user to view, preferably alongside the display of the compared systems, screens of individual transactions. The individual transactions may preferably correspond to various pictures associated with certain images. Each individual transaction may include two sides of a check. Each individual transaction may preferably include the front side and the back side of a check. A user may preferably view the two sides of the check while, substantially simultaneously thereto, the user may view the reasons for rejections corresponding to both the production system and the development system.

Screen 404 also enables a user to make certain calls to another application SOAP for transaction review. GUI screen 404 preferably shows a first digital image as generated by the development.

It should be further noted that screen 404 indicates, in a header, that in one exemplary embodiment, out of 20,014 results, the production system obtained IQA 5,264 good results whereas the development system obtained 8,266 good results.

In addition, it should be noted that screen 404 may be user-definable—i.e., a user may be allowed to select one or more reasons for rejections and remove them from the analysis set forth in screen 404. For example, a user may be enabled to remove the "restrictive endorsement-bad quality" rejection from the development system and then re-run the comparison between the production system and the development system. Such a removal may preferably alter the final count of differences between the production system and the development system because all the pairs of missing/invalid endorsement (in the production system) and restrictive endorsement-bad quality (in the development system) pairs may be eliminated and replaced by pairs of missing/invalid endorsement (in the production system) and image quality analysis good ("IQAGOOD") (in the development system).

Thus, systems and/or methods for providing a version performance data delta tester are therefore provided. Persons skilled in the art will appreciate that the present invention can be practiced by other than the described embodiments, which are presented for purposes of illustration rather than of limitation, and that the present invention is limited only by the claims that follow.

What is claimed is:
1. An apparatus comprising a computer machine for performing digital image data delta testing, the apparatus comprising:
a first machine readable memory configured to store a legacy version of a software application for testing a plurality of digital images, the plurality of digital images derived using a handheld camera, the plurality of digital images corresponding to a plurality of physical objects, a first of the plurality of digital images being formed by positioning the handheld camera at a first location and taking a digital image of a first side of a paper check, a second of the plurality of digital images being formed by positioning the handheld camera at second location and taking a digital image of a second side of the paper check, the second side of the paper check being opposite the first side of the paper check, the legacy version that determines whether the plurality of digital images are rejected in response to a legacy rejection included in a first group of rejections;
a second machine readable memory configured to store an updated version of the software application, the updated version that determines whether the plurality of digital images are rejected in response to an updated rejection included in a second group of rejections;
a receiver configured to receive the plurality of digital images;
a processor configured to:
process the plurality of digital images using the legacy version;
process the plurality of digital images using the updated version;
identify one or more of the plurality of digital images that trigger a first rejection with the legacy version and that trigger a second rejection with the updated version wherein the first rejection and the second rejection are the same;
identify one more of the plurality of digital images that trigger a first rejection with the legacy version and that trigger a second rejection with the updated version wherein the first rejection and the second rejection are different; and
for each combination of a first rejection with the legacy version and a second rejection with the updated version that are triggered for a digital image and are different, tally a number of digital images that trigger the combination of the first rejection and the second rejection; and
a separate memory at a remote location, wherein the plurality of digital images, the plurality legacy rejections, and the plurality of updated rejections are all received by the receiver within a pre-determined time following implementation of a failover process, said failover process that maintains, at the separate memory, an electronic copy of the plurality of digital images, an electronic copy of the plurality of legacy rejections, and an electronic copy of the plurality of updated rejections.

2. The apparatus of claim 1, wherein the first group of rejections includes poor image quality, out of focus, unable to read a magnetic ink character recognition ("MICR") line, too much rotation angle, image too small, invalid image jurisdiction, missing/invalid endorsement and corners cut.

3. The apparatus of claim 1, wherein the second group of rejections includes poor image quality, out of focus, unable to read a magnetic ink character recognition ("MICR") line, too much rotation angle, image too small, invalid image jurisdiction, missing/invalid endorsement, corners cut, contrast of image and bad crop.

4. The apparatus of claim 1 wherein the legacy version is characterized by a device operating system ("OS"), a device type and a device version.

5. The apparatus of claim 1 wherein the updated version is characterized by a device operating system ("OS"), a device type and a device version.

6. The apparatus of claim 1 wherein the receiver is configured to receive the plurality of digital images in series.

7. The apparatus of claim 1 wherein the receiver is configured to receive the plurality of digital images at a rate of one image at a time.

8. The apparatus of claim 1 further comprising a database, the database that stores the plurality of digital images after receiving the plurality of digital images from failed transactions at a mobile device, wherein the processor is further configured to throttle a rate of digital images receipt from the database.

9. A version performance digital image data delta tester comprising:
   a receiver configured to receive:
      a plurality of digital images, the plurality of digital images derived, using a handheld camera, from a plurality of physical objects, a first of the plurality of digital images being formed by positioning a handheld camera at a first location and taking a digital image of a first side of a paper check, a second of the plurality of digital images being formed by positioning the handheld camera at second location and taking a digital image of a second side of the paper check, the second side of the paper check being opposite the first side of the paper check;
      a plurality of legacy rejections associated with the plurality of digital images, said legacy rejections associated with a legacy version of an application, each legacy rejection associated with a rejection included in a first group of rejections;
      a plurality of updated rejections associated with the plurality of digital images, said updated rejections associated with an updated version of the application, each updated rejection associated with a rejection included in a second group of rejections;
   a processor configured to:
      store the plurality of digital images, the plurality of legacy rejections, and the plurality of updated rejections;
      identify one or more of the plurality of digital images that trigger a first rejection with the legacy version and that trigger a second rejection with the updated version wherein the first rejection and the second rejection are the same; and
      identify one more of the plurality of digital images that trigger a first rejection with the legacy version and that trigger a second rejection with the updated version wherein the first rejection and the second rejection are different; and
      for each combination of a first rejection and a second rejection that are triggered for a digital image and are different, tally a number of digital images that trigger the combination of the first rejection and second rejection; and
   a separate memory at a remote location, wherein the plurality of digital images, the plurality of legacy rejections, and the plurality of updated rejections are all received by the receiver within a pre-determined time following implementation of a failover process, said failover process that maintains, at the separate memory, an electronic copy of the plurality of digital images, an electronic copy of the plurality of legacy rejections, and an electronic copy of the plurality of updated rejections.

10. The tester of claim 9 wherein the physical objects are checks and wherein the digital images are digital check images.

11. The version performance digital image delta tester of claim 9, wherein the legacy version is characterized by a device operating system ("OS"), a device type and a device version.

12. The version performance digital image delta tester of claim 9, wherein the updated version is characterized by a device operating system ("OS"), a device type and a device version.

13. The version performance digital image delta tester of claim 9, wherein the receiver is configured to receive the plurality of digital images at a rate of one image at a time.

14. The version performance digital image delta tester of claim 9, further comprising a database, the database that stores the of the plurality of digital images after receiving the digital images from failed transactions at a mobile device, wherein the processor is further configured to throttle a rate of digital images receipt from the database.

15. An article of manufacture comprising a nontransitory computer usable medium having computer readable program code embodied therein, the code when executed by a processor causes a computer to obtain version performance digital image data delta information, the computer readable program code in said article of manufacture comprising:
   computer readable program code for causing the computer to receive:
      a plurality of digital images, a first of the plurality of digital images being formed by positioning a handheld camera at a first location and taking a digital image of a first side of a paper check, a second of the plurality of digital images being formed by positioning the handheld camera at second location and taking a digital image of a second side of the paper check, the second side of the paper check being opposite the first side of the paper check;
      a plurality of legacy rejections associated with the digital images the legacy rejections associated with a legacy version of an application;
      a plurality of updated rejections associated with the digital images, said updated rejections associated with an updated version of the application;
   computer readable program code for causing the computer to:
      identify one or more digital images that trigger a first rejection with the legacy version and that trigger a second rejection with the updated version wherein the first rejection and the second rejection are the same;
      identify one more digital images that trigger a first rejection with the legacy version and that trigger a second rejection with the updated version wherein the first rejection and the second rejection are different; and
      for each combination of a first rejection and a second rejection that are triggered for a digital image and are different, tally a number of digital images that trigger the combination of the first rejection and the second rejection; and
   computer readable program code for causing the computer to maintain a separate memory at a remote location, wherein the plurality of digital images, the plurality of legacy rejections, and the plurality of updated rejections are all received by the receiver within a pre-determined time following implementation of a failover process, said failover process that maintains, at the separate memory, an electronic copy of the plurality of digital images, an electronic copy of the plurality of legacy rejections, and an electronic copy of the plurality of updated rejections.

16. The article of manufacture of claim 15 wherein the plurality of digital images are digital check images.

* * * * *